Jan. 5, 1971

J. F. TEIXEIRA 3,553,579

APPARATUS FOR MEASURING THE DIFFERENCE IN PHASE BETWEEN TWO
SIGNALS OF THE SAME FREQUENCY, ONE HAVING NOISE
ASSOCIATED THEREWITH

Filed June 20, 1968

INVENTOR.
JAMES F. TEIXEIRA
BY

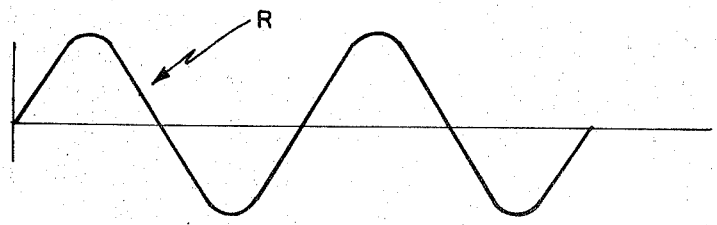
FIG. 2(a)
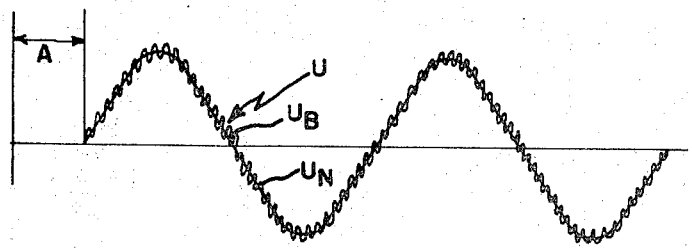
FIG. 2(b)
FIG. 2(c)
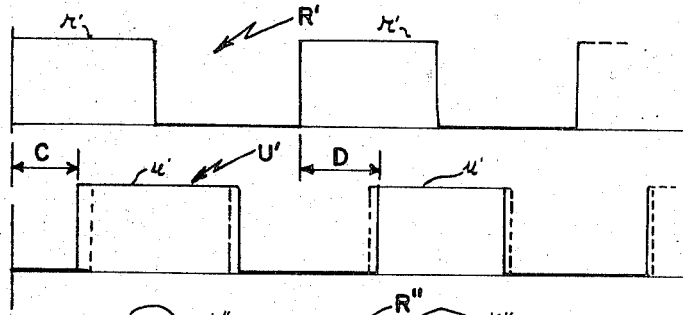
FIG. 2(d)
FIG. 2(e)
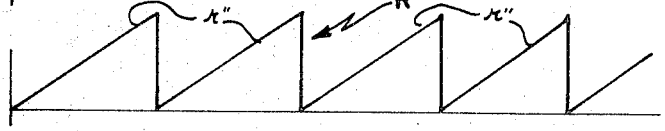
FIG. 2(f)
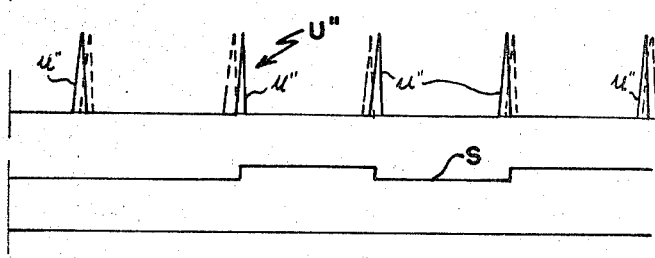
FIG. 2(g)
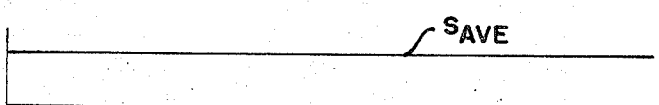
FIG. 2(h)
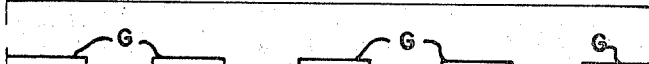
FIG. 2(i)
INVENTOR.
JAMES F. TEIXEIRA United States Patent Office 3,553,579
Patented Jan. 5, 1971

3,553,579
APPARATUS FOR MEASURING THE DIFFERENCE IN PHASE BETWEEN TWO SIGNALS OF THE SAME FREQUENCY, ONE HAVING NOISE ASSOCIATED THEREWITH
James F. Teixeira, Hudson, Mass., assignor to Sylvania Electric Products Inc., a corporation of Delaware
Filed June 20, 1968, Ser. No. 738,703
Int. Cl. G01r 25/00
U.S. Cl. 324—83                    12 Claims

ABSTRACT OF THE DISCLOSURE

Apparatus for measuring the difference in phase, from 0° to 180°, between a noise-free sinusoidal reference signal of a predetermined frequency and an unknown sinusoidal signal of the same frequency but having noise associated therewith. The unknown and reference signals are applied to respective limiters and converted to square-wave pulse trains which trigger, respectively, a sample-pulse generator and a ramp generator. Sampling pulses are produced by the pulse generator and used to sample a train of ramp voltage signals applied to a sample-and-hold circuit by the ramp generator. The sampled signal portions are converted in the sample-and-hold circuit to a continuous voltage signal of varying amplitude representative of the phase displacement between the unknown and reference signals. The noise content of the continuous voltage signal is reduced by a low-pass filter to provide an analog signal representative of the phase displacement between the reference and unknown signals. To provide a digital representation, the analog signal is applied to an analog comparator together with the train of ramp voltage signals. The comparator compares the signals and produces a square-wave pulse train representing the phase displacement between the unknown signal and the reference signal, which pulse train is used to gate clock signals to a digital counter which provides a digital indication of the amount of phase displacement.

BACKGROUND OF THE INVENTION

The present invention relates to phase measuring apparatus and, more particularly, to apparatus for providing analog and digital measurements of the phase displacement between two signals of the same frequency, one of the signals being noise-free and the other having noise associated therewith.

Various types of apparatus are known for measuring or determining the difference in phase between two signals of the same frequency, for example, an unknown sinusoidal signal and a reference sinusoidal signal. A very common approach for measuring phase displacement between two sinusoidal signals of the same frequency is to detect the relative locations of the zero-axis crossings of the signals and to compare the relative locations of the zero-axis crossings so as to provide a measure of the phase displacement. While, for the most part, apparatus using such an approach is capable of producing satisfactorily precise and accurate measurements of the difference in phase between two signals, the performance of such apparatus deteriorates when one of the signals has unwanted noise associated therewith of a variable amplitude and of a randomly-occurring nature. In this situation, the presence of the randomly-occurring noise interferes with the accurate detection and comparison of the zero-axis crossings inasmuch as a zero-axis crossing of the noise often cannot be distinguished from a zero-axis crossing of the signal itself. As a result, phase error is introduced to the phase measuring operation and incorrect or inaccurate phase displacement measurements are produced.

One well known technique employed heretofore to eliminate or suppress the undesirable effects of noise of the above-mentioned nature has been to use a narrow-bandwidth filter which removes the frequencies constituting the noise. However, such filters are expensive and, furthermore, are subject to drift with continuing use and exposure to wide temperature variations with the result that phase error is introduced to the phase measurement operation. Although the effects of drift can be eliminated, this is often quite difficult. Thus, where accuracy is an important requirement, the use of narrow-bandwidth filters has not been entirely satisfactory.

SUMMARY OF THE INVENTION

Briefly, in accordance with the present invention, a phase apparatus is provided for measuring the phase displacement between a first signal of a predetermined frequency and a second signal of the same frequency as the first signal, the second signal including therein an unwanted component. The first signal is received by a first means and a ramp signal is initiated by the first means at predetermined times during each cycle of the first signal. By way of example, the predetermined times may be the zero-axis crossings of the first signal. The second signal is received by a second means and a sampling signal is initiated by the second means at the same predetermined times during each cycle of the second signal. Thus, for each ramp signal, a corresponding sampling signal is produced. As in the case of the first signal, the predetermined times during each cycle of the second signal may be the zero-axis crossings of the second signal.

The ramp signals are sampled by the sampling signals in a suitable means and the sampled portions of the ramp signals are converted to a continuous signal of varying amplitude equal to the amplitudes of the sampled portions of the ramp signals. The continuous signal is averaged by an averaging means and a signal having a constant amplitude is produced by the averaging means. The signal of constant amplitude represents the phase displacement between the first signal and the second signal.

The above-mentioned signal of constant amplitude actually represents the analog value of the phase displacement between the first signal and the second signal. To obtain a digital representation of the phase displacement between the first signal and the second signal, the signal of constant amplitude is converted by a conversion means to a digital signal. A preferred form of the conversion means includes a comparator means, a clock means, a coincidence gate means, and a digital counter means. In operation, the signal of constant amplitude is compared in the comparator means with the ramp signals, and an output signal is produced by the comparator means when the amplitude of the signal of constant amplitude is greater than the amplitude of a ramp signal. Each output signal produced by the comparator means gates out clock signals of a predetermined frequency applied to the coincidence gate means during the output signal. The digital counter means counts the number of clock signals gated out of the coincidence gate means during each output signal and provides a digital signal representative of the phase displacement between the first signal and the second signal in accordance with the number of clock signals counted.

BRIEF DESCRIPTION OF THE DRAWING

FIGS. 2(a) through 2(i) illustrate waveforms of electrical signals occurring at various points in the phase displacement measuring apparatus shown in FIG. 1.

DESCRIPTION OF THE PREFERRED EMBODIMENT OF THE INVENTION

General description—FIG. 1

Figure 1:
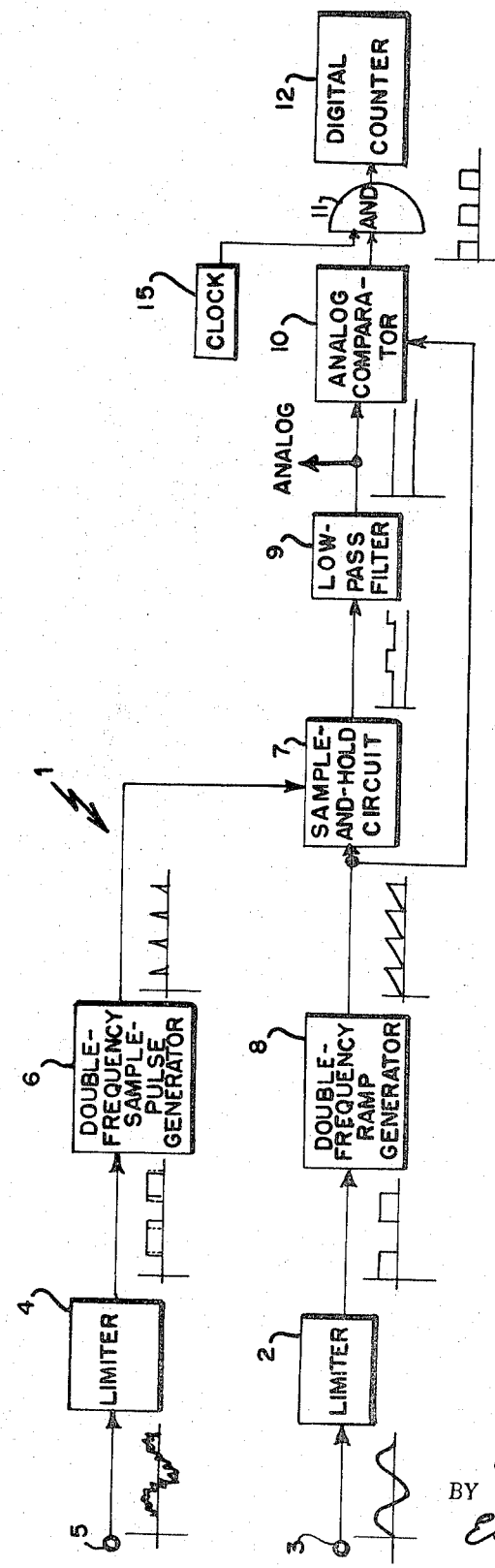
FIG. 1 illustrates in schematic block diagram form a phase displacement measuring apparatus in accordance with the present invention.

Referring to FIG. 1, there is shown in schematic block diagram form a phase displacement measuring apparatus 1 in accordance with the present invention. As shown in FIG. 1, the phase displacement measuring apparatus 1 includes a first limiter 2 adapted to receive at an input terminal 3 a noise-free sinusoidal reference signal, and a second limiter 4 adapted to receive at an input terminal 5 a noise-containing sinusoidal signal of the same frequency as the reference signal and designated the "unknown" signal. The reference sinusoidal signal is converted by the limiter 2 to a square-wave pulse train which triggers a double-frequency ramp generator 8 connected thereto. A train of ramp voltage signals is generated by the double-frequency ramp generator 8 and applied to a first input of a sample-and-hold circuit 7, one ramp voltage signal being initiated at the occurrence of each zero-axis crossing of the reference signal.

A second input signal is applied to the sample-and-hold circuit 7 by a double-frequency sample-pulse generator 6 connected to the limiter 4. The limiter 4 converts the unknown noise-containing sinusoidal signal to a square-wave pulse train which triggers the double-frequency sample-pulse generator 6 to cause a train of sampling pulses to be generated thereby, one sampling pulse being initiated at each zero-axis crossing of the unknown noise-containing signal. Since the unknown and reference signals are of the same frequency, a sampling pulse is generated corresponding to each ramp voltage signal from the double-frequency ramp generator 8.

As will be discussed more fully hereinafter, in the sample-and-hold circuit 7, each ramp voltage signal produced by the double-frequency ramp generator 8 is sampled by the corresponding sampling pulse produced by the double-frequency sample-pulse generator 6. Because of the noise in the unknown signal, each sampling pulse can occur at a different time after the start of the corresponding ramp signal. Therefore, the sampled portions of the ramp voltage signals can be of different amplitudes, because of the noise. The sampled portions of the ramp voltage signals are converted by the sample-and-hold circuit 7 to a continuous signal of varying amplitude which is representative of the phase shift between the noise-free sinusoidal reference signal and the noise-containing unknown sinusoidal signal. The continuous signal from the sample-and-hold circuit 7 is applied to a low-pass filter 9 and averaged such that the noise content of the voltage signal is reduced. The output of the low-pass filter 9 is representative of the analog value of the phase displacement between the unknown signal and the reference signal.

To obtain a digital measurement of the phase difference between the unknown signal and the reference signal, the averaged output signal from the low-pass filter 9, of a constant D.C. value, is applied to a first input of an analog comparator 10, and the train of ramp voltage signals from the double-frequency ramp generator 8 is applied to a second input of the analog comparator 10. The analog comparator 10 compares the amplitudes of the two signals and, for a comparison of the average output signal and an individual ramp voltage signal, produces a pulse having a width corresponding to the time that the value of the amplitude of the ramp voltage signal is less than the value of the amplitude of the average output signal from the low-pass filter 9. As will become more fully apparent hereinafter from a description of the electrical waveforms of FIGS. 2(a) through 2(i), the width of each output pulse produced by the analog comparator 10 represents the phase displacement between a half-cycle of the noise-containing unknown sinusoidal signal and a corresponding half-cycle of the noise-free sinusoidal reference signal.

The digital measurement of the phase displacement between the reference and unknown sinusoidal signals is accomplished by relatively low-cost analog-to-digital conversion apparatus by measuring the widths of each of the pulses of the train of output pulses produced by the analog comparator 10. More specifically, the train of output pulses produced by the analog comparator 10 is applied to a first input of an AND gate 11 to gate out high-frequency clock signals applied to a second input of the AND gate 11 by a clock 15. The degree of accuracy required, for example, 1°, 0.1°, etc., is determined by appropriate selection of the frequency of clock signals produced by the clock 15. The clock signals gated out from the AND gate 11 and corresponding to each of the pulses produced by the analog comparator 10 are applied to a digital counter 12 and counted therein, the digital count in the digital counter 12 at the termination of each pulse from the analog comparator 10 indicating the phase displacement between a half-cycle of the noise-containing unknown signal and a corresponding half-cycle of the noise-free reference signal.

Detailed description—FIGS. 1, 2(a)–2(i)

FIGS. 2(a)–2(i) illustrate typical waveforms of electrical signals occurring at various points in the phase displacement measuring apparatus 1 shown in FIG. 1. FIG. 2(a) illustrates two cycles of a typical noise-free sinusoidal reference signal R which is applied to the input terminal 3 of the limiter 2 in FIG. 1. FIG. 2(b) illustrates two cycles of a typical unknown sinusoidal signal U consisting of a base sinusoidal signal $U_B$ and a varying-amplitude, randomly-occurring noise signal $U_N$ superimposed on the base sinusoidal signal $U_B$. The unknown signal U is applied to the input terminal 5 of the limiter 4 in FIG. 1. As shown in FIG. 2(b), the base sinusoidal signal $U_B$ is phase displaced from the reference signal R by an amount A which has a value of 0° to 180°. It is this phase displacement A which is detected and measured by the phase displacement measuring apparatus 1 of FIG. 1.

The limiter 2, in response to receiving the reference signal R, converts the reference signal R in a conventional manner to a square-wave pulse train R' of the same frequency as the reference signal R. The waveform of the square-wave pulse train R' is illustrated in FIG. 2(c). In a similar fashion, the limiter 4, in response to receiving the unknown noise-containing signal U, converts the unknown noise-containing signal U to a square-wave pulse train U' of the same frequency as the base sinusoidal signal $U_B$. However, as indicated by the waveform of the square-wave pulse train U' in FIG. 2(d), the leading and trailing edges of the pulses u' (shown in solid) comprising the train of pulses U' do not coincide in time with the zero-axis crossings of the base sinusoidal signal $U_B$. In other words, the width of each pulse u' is not equal to the duration between a successive corresponding pair of zero-axis crossings of the base sinusoidal signal $U_B$. These variations in the occurrence of leading and trailing edges of the pulses u' in the pulse train U' are present because the limiter 4 is unable to sense the precise zero-axis crossings of the base sinusoidal signal $U_B$ due to the conflicting and confusing presence of the noise signal $U_N$ at the regions of the zero-axis crossings of the base signal $U_B$. As a consequence, the pulses u' of the pulse train U', rather than being of equal width and having the leading and trailing edges corresponding with the zero-axis crossings of the base signal $U_{B'}$ as indicated by the dotted lines in FIG. 2(d), may be of variable width and separation as indicated in solid in FIG. 2(d).

It is further apparent from FIG. 2(d) that the variations in width and separation of the pulses u' of the pulse train U' cause the phase displacements between corresponding cycles of the pulse trains R' and U' to also vary from cycle to cycle, noting, for example, the phase displacements C and D in FIG. 2(d). The manner in which the above-mentioned effects of the noise signal $U_N$ are eliminated by the phase displacement measuring apparatus 1 of FIG. 1 will now be described in detail.

The square-wave pulse train R' produced by the limiter 2 is applied to the double-frequency ramp generator 8. The double-frequency ramp generator 8 is triggered by the leading and trailing edges of the pulses r' comprising the pulse train R' to generate a series or train R'' of ramp voltage signals r'' such as shown in FIG. 2(e). Since triggering of the ramp generator 8 occurs on both the leading and trailing edges of the pulses r' of the pulse train R', the train R'' of ramp voltage signals r'' generated thereby has a frequency twice that of the square-wave pulse train R'. The reason and purpose of this double-frequency operation will become more apparent hereinafter. The train R'' of voltage ramp signals r'' is applied to one input of the sample-and-hold circuit 7 and also to one input of the analog comparator 10. The sample-and-hold circuit 7, of a conventional construction, is adapted to produce an output signal during a given sampling interval and to "hold" the signal until the next sampling interval. The value of the output signal is increased or decreased in accordance with the value of the signal produced in the next sampling interval.

A second input to the sample-and-hold circuit 7 is provided by the double-frequency sample-pulse generator 6. The double-frequency sample-pulse generator 6 is triggered by the leading and trailing edges of the pulses u' of the pulse train U' and produces a pulse train U'' of narrow-width sampling pulses u'' corresponding in time to the leading and trailing edges of the pulses u' of the pulse train U', noting FIGS. 2(d) and 2(f). Thus, as in the case of the train R'' of ramp voltage signals, FIG. 2(e), the train U'' of sampling pulses has a frequency twice that of the associated pulse train U'. As shown in FIG. 2(f), the specific locations along the zero axis of the various sampling pulses u'' vary in accordance with the occurrences of the leading and trailing edges of the corresponding pulses u' of the train of pulses U' causing their production. In FIG. 2(f) the solid lines represent the form and location of the sampling pulses u'' actually produced because of the presence of the noise signal $U_N$, whereas the dotted lines represent the form and location of sampling pulses if no noise were present.

The ramp voltage signals r'' applied to the sample-and-hold circuit 7 by the double-frequency ramp generator 8 are sampled in succession in the sample-and-hold circuit 7 by the corresponding sampling pulses u'' generated by the double-frequency sample-pulse generator 6. The sampled portions of the ramp voltage signals r'' are converted by the sample-and-hold circuit 7 into a continuous output signal of varying amplitude such as shown at S in FIG. 2(g). The signal S of FIG. 2(g) is of a varying amplitude inasmuch as the sampling of the various "ramps" of the ramp voltage signals r'' by the sampling pulses u'' occur at different points along the zero axis because of the different positions of the sampling pulses u'' along the zero axis (due to the presence of the noise signal $U_N$). It is to be noted that the amplitude of each point of the varying-amplitude output signal S produced by the sample-and-hold circuit 7 is generally proportional to the phase difference between the input signals R and U at the corresponding points.

As stated previously, the frequency of the pulse train U'' generated by the double-frequency sample-pulse generator 6 is twice that of the square-wave pulse train U' produced by the limiter 4, and the frequency of the ramp voltage signal train R'' is twice that of the square-wave train R' produced by the limiter 2. The purpose of this double-frequency mode of operation is to allow sampling to occur at times corresponding to both zero-axis crossings of each half-cycle of the unknown signal U. In this manner, if the operating voltage level (i.e., input voltage offset) of the limiter 4 varies slightly so as to alter the time of occurrence of the leading and trailing edges of the pulses u' of the square-wave train U' (FIG. 2(d)), the effect of ampling a first ramp voltage signal r'' (FIG. 2(e)) at the time of occurrence of the leading edge of an associated pulse u' of the square-wave train U' cancels the effect of sampling the next successive ramp voltage signal r'' at the time of occurrence of the trailing edge of the pulse u'. This result occurs inasmuch as a change in the operating voltage level of the limiter 4 introduces equal and opposite phase changes in the leading and trailing edges of a pulse u' derived from a half-cycle of the unknown signal U.

The above-described double-frequency mode of operation has been found to be desirable in the present invention. However, it is to be appreciated that if highly stable limiters are used to convert the unknown and reference signals to square-wave pulse trains, a single-frequency mode of operation may be empolyed wherein sampling occurs only once for each cycle of the unknown signal U. More particularly, ramp signals are initiated coinciding with alternate zero-axis crossings of the reference signal and sampling pulses are initiated coinciding with alternate zero-axis crossings of the unknown signal. In this manner, phase measurements of 0° to 360°, rather than 0° to 180°, may be obtained.

The varying amplitude signal S produced by the sample-and-hold circuit 7 in the above-described manner is applied to the low-pass filter 9 wherein the noise content of the signal S is reduced by averaging the signal. The averaged signal produced by the low-pass filter 9 represents the analog value of the phase displacement between the unknown signal U and the reference signal R and is shown as $S_{ave}$ in FIG. 2(h). It is to be appreciated that no steady-state phase shift is introduced by the filtering function of the low-pass filter 9.

To obtain a digital measurement of the phase displacement between the unknown signal U and the reference signal R, the averaged signal $S_{ave}$ is then applied to one input of the analog comparator 10, the other input being the train R'' of ramp voltage signals from the double-frequency ramp generator 8 as previously mentioned. The analog comparator 10 operates to compare the amplitudes of the two signals and, for each comparison of the averaged output signal $S_{ave}$ with an individual ramp voltage signal r'', produces a pulse having a width corresponding to the time that the value of the amplitude of the ramp voltage signal r'' is less than the value of the constant D.C. amplitude of the averaged output signal $S_{ave}$. The width of each pulse also corresponds to the phase displacement between corresponding half-cycles of the noise-free sinusoidal reference signal R and the noise-containing unknown signal U. The pulse train produced by the analog comparator 10 is illustrated in FIG. 2(i).

As shown in FIG. 2(i), a pulse G is initiated by the analog comparator 10 whenever the averaged signal $S_{ave}$ becomes greater than the amplitude of a ramp signal r'', and the pulse is terminated when the amplitude of the averaged signal $S_{ave}$ (FIG. 2(h)) becomes less than the amplitude of the ramp signal. It is to be noted that the width of each pulse G, as shown at A' in FIG. 2(i), is substantially equal to the phase displacement A between the noise-free sinusoidal signal R (FIG. 2(a)) and the base sinusoidal signal $U_B$ (FIG. 2(b)). Accordingly, the pulse width A' need only be measured to determine the amount of phase displacement A between the reference signal R and the unknown signal U. This measurement of the width of the pulses G is accomplished by a relatively low-cost analog-to-digital conversion apparatus including the AND gate 11, the clock 15, and the digital counter 12 of FIG. 1.

The output pulses G from the analog comparator 10 are applied to one input of the AND gate 11 to gate out high-frequency clock signals applied to a second input of the AND gate 11 by the clock 15. The clock signals gated out from the AND gate 11 and corresponding to each of the pulses G produced by the analog comparator 10 are applied to the digital counter 13 and counted therein. The particular digital count in the digital counter 12 at the termination of each pulse G indicates the phase displacement between corresponding cycles of the noise-free reference signal R and the noise-containing unknown signal U. By way of example, if the frequency of the reference and unknown signals is 1 kilohertz, a clock frequency of 360 kilohertz produces an accuracy to 1° in the measurement of the phase displacement between the reference and unknown signals. A clock frequency of 3.6 megahertz results in an accuracy to 0.1°, etc.

It will now be apparent that a novel phase displacement measuring apparatus has been disclosed in such full, clear, concise, and exact terms so as to enable any person skilled in the art to which such apparatus pertains to construct and use the same. It will also be apparent that various changes and modifications may be made in form and detail by those skilled in the art without departing from the spirit and scope of the invention. Therefore, it is intended that the invention should not be limited except as by the appended claims.

What is claimed is:

1. Phase apparatus for measuring the phase displacement between a first signal of a predetermined frequency and a second signal of the same frequency as the first signal, said second signal including therein an unwanted component, comprising:

first means adapted to receive the first signal and to initiate an individual ramp signal at each of a plurality of predetermined times during each cycle of the first signal;

second means adapted to receive the second signal and to initiate an individual sampling signal at the same predetermined times during each cycle of the second signal, each sampling signal corresponding to one of the ramp signals;

means for sampling portions of the ramp signals with the corresponding sampling signals and for converting the sampled portions of the ramp signals to a continuous signal of varying amplitude equal to the amplitude equal to the amplitudes of the sampled portions of the ramp signals; and averaging means for averaging the continuous signal and for producing a signal having a constant amplitude, said signal of constant amplitude being representative of the phase displacement between the first and the second signal.

2. Phase apparatus in accordance with claim 1 wherein the predetermined times during each cycle of the first and second signals are zero-axis crossings of the first and second signals.

3. Phase apparatus in accordance with claim 1 wherein said first means includes a first limiter means adapted to convert said first signal to a first train of square-wave signals of the same frequency as said first signal, and a double-frequency ramp generator means operable to generate a ramp signal at each of the leading and trailing edges of each of the square-wave signals of the first train of square-wave signals; and said second means includes a second limiter means adapted to convert said second signal to a second train of square-wave signals of the same frequency as said second signal, and a double-frequency sample-pulse generator means operable to generate a sampling signal at each of the leading and trailing edges of each of the square-wave signals of the second train of square-wave signals.

4. Phase apparatus in accordance with claim 1 wherein said averaging means is a low-pass filter means.

5. Phase apparatus in accordance with claim 1 further including conversion means for converting the constant amplitude signal from the averaging means to a digital signal representative of the phase displacement between the first signal and the second signal.

6. Phase apparatus in accordance with claim 5 wherein the conversion means includes:

comparator means adapted to receive and to compare the signal of constant amplitude and the ramp signals, and operable to produce an output signal when the amplitude of the signal of constant amplitude is greater than the amplitude of a ramp signal;

clock means adapted to produce clock signals of a predetermined frequency;

coincidence gate means adapted to receive clock signals from the clock means and each output signal produced by the compaartor means, each said output signal produced by the comparator means gating out from the coincidence gate means the clock signals applied to the coincidence gate means during the output signal; and digital counter means adapted to count the number of clock signals gated out of the coincidence gate means during each output signal and to provide a digital signal representative of the phase displacement between the first signal and the second signal in accordance with the number of clock signals counted.

7. Phase apparatus for determining the phase displacement between a first sinusoidal signal of a predetermined frequency and a second sinusoidal signal of the same frequency as the first sinusoidal signal and having an unwanted signal associated therewith, comprising:

first means for converting the first sinusoidal signal to a first train of pulses of the same frequency as the first sinusoidal signal;

second means for converting the second sinusoidal signal and the unwanted signal associated therewith to a second train of pulses of the same frequency as the second sinusoidal signal;

ramp signal generating means operative in response to the first train of pulses to generate a train of ramp signals of a frequency twice that of the frequency of the first train of signals;

sampling pulse generating means operative in response to the second train of pulses to generate a train of sampling pulses of a frequency twice that of the second train of pulses;

means for sampling portions of the ramp signals with the sampling pulses and for converting the sampled portions of the ramp signals to a continuous signal of varying amplitude equal to the amplitudes of the sampled portions of the ramp signals; and averaging means for averaging the continuous signal and for producing a signal having a constant amplitude, said signal of constant amplitude being representative of the phase displacement between the first sinusoidal signal and the second sinusoidal signal.

8. Phase apparatus in accordance with claim 7 wherein the averaging means is a low-pass filter.

9. Phase apparatus in accordance with claim 8 wherein the first means and the second means are limiters and the first and second trains of pulses are square-wave trains of pulses.

10. Phase apparatus in accordance with claim 8 further including conversion means for converting the constant amplitude signal from the averaging means to a digital signal representative of the phase displacement between the first sinusoidal signal and the second sinusoidal signal.

11. Phase apparatus in accordance with claim 10 wherein the conversion apparatus comprises:

comparator means adapted to receive and to compare the signal of constant amplitude and the train of ramp signals, and operable to produce an output signal when the amplitude of the signal of constant amplitude is greater than the amplitude of a ramp signal;

clock means adapted to produce clock signals of a predetermined frequency;

coincidence gate means adapted to receive clock signals from the clock means and each output signal produced by the comparator means, each said output signal produced by the comparator means gating out from the coincidence gate means the clock signals applied to the coincidence gate means during the output signal; and digital counter means adapted to count the clock signals gated out of the coincidence gate means during each output signal and to provide a digital signal representative of the phase displacement between the first sinusoidal signal and the second sinusoidal signal in accordance with the number of clock signals counted.

12. Phase apparatus for determining the phase displacement, from 0° to 180°, between a first sinusoidal signal of a predetermined frequency and a second sinusoidal signal of the same frequency as the first sinusoidal signal, said second sinusoidal signal including therein a varying-amplitude, randomly-occurring noise signal, comprising:

- a first limiter adapted to convert said first sinusoidal signal to a first train of square-wave pulses of the same frequency as the first sinusoidal signal, the leading and trailing edges of the square-wave pulses of the first train of square-wave pulses coinciding with the zero-axis crossings of the first sinusoidal signal;
- a double-frequency ramp generator operable to generate a ramp signal at the leading and trailing edges of each of the square-wave pulses;
- a second limiter adapted to convert said second sinusoidal signal and the noise signal to a second train of square-wave pulses of the same frequency as the second sinusoidal signal, the leading and trailing edges of the square-wave pulses of the second train of square-wave pulses coinciding with the zero-axis crossings of the second sinusoidal signal as affected by the noise signal;
- a double-frequency sample-pulse generator operable to generate a narrow-width sampling signal at the leading and trailing edges of each of the square-wave pulses of the second train of square-wave pulse, one sampling signal corresponding to each of the ramp signals;
- a sample-and-hold circuit operable to sample portions of the ramp signals with the corresponding sampling signals and to convert the sampled portions of the ramp signals to a continuous signal of varying amplitude equal to the amplitudes of the sampled portions of the ramp signals;
- a low-pass filter operable to average the continuous signal from the sample-and-hold circuit to reduce the noise content of the continuous signal and to produce a constant amplitude signal, said constant-amplitude signal representing the analog value of the phase displacement between the first and second sinusoidal signals;
- an analog comparator adapted to receive and to compare the constant-amplitude signal and the ramp signals and operable to produce an output signal when the amplitude of the constant-amplitude signal is greater than the amplitude of a ramp signal, the width of said output signal representing the phase displacement between the first and second sinusoidal signals;
- a clock adapted to produce clock pulses of a predetermined frequency;
- an AND gate adapted to receive clock pulses from the clock and each output signal produced by the analog comparator, each said output signal produced by the analog comparator gating out from the AND gate the clock pulses applied to the AND gate during the output signal; and
- a digital counter adapted to count the clock pulses gated out of the AND gate during each output signal and to provide a digital indication of the phase displacement between the first and second sinusoidal signal in accordance with the number of clock pulses counted.

References Cited

UNITED STATES PATENTS

| 2,900,507 | 8/1959 | Rogers | 324—83(A)UX |
| 2,987,674 | 6/1961 | Shain | 324—68(C)X |
| 3,034,053 | 5/1962 | Lanning et al. | 324—83(D) |
| 3,329,895 | 7/1967 | Lenz | 324—83(A) |
| 3,332,080 | 7/1967 | Verwey | 324—83(D) |

ALFRED E. SMITH, Primary Examiner

U.S. Cl. X.R.

329—134

PO-1050
(5/69)

UNITED STATES PATENT OFFICE
CERTIFICATE OF CORRECTION

Patent No. 3,553,579  Dated January 5, 1971

Inventor(s) James F. Teixeira

It is certified that error appears in the above-identified patent and that said Letters Patent are hereby corrected as shown below:

In claim 9, column 8, line 55, "8" should be --7--;

In claim 10, column 8, line 59, "8" should be --7--

Signed and sealed this 30th day of March 1971.

(SEAL)
Attest:

EDWARD M. FLETCHER, JR.
Attesting Officer

WILLIAM E. SCHUYLER, JR
Commissioner of Patents